United States Patent Office.

PELAG WERNI, OF CHICAGO, ILLINOIS, ASSIGNOR TO HIMSELF AND JAMES W. MORRISON, OF SAME PLACE.

Letters Patent No. 99,267, dated January 25, 1870.

IMPROVED ROOFING-MATERIAL.

The Schedule referred to in these Letters Patent and making part of the same.

*To all whom it may concern:*

Be it known that I, PELAG WERNI, of Chicago, in the county of Cook, and State of Illinois, have invented a new and useful "Improvement in Roofing-Material;" and I do hereby declare the following to be a full, clear, and exact description of the same.

The nature of my invention consists in a compound composed of clay, horse-manure, and glue.

To enable those skilled in the art to understand how to manufacture and use my invention, I will describe the same with particularity.

I take clay and horse-manure, in equal parts, and mix them thoroughly. I dissolve glue in water, in about the quantity of one-fourth of one pound of glue, to a gallon of water, and then wet the clay and horse-manure mixed with the prepared water, till it is about the consistency of ordinary plaster.

Instead of covering the roof with ordinary boards, I cover it with narrow strips, or lath, the same as it would be prepared for a coat of plaster, and then apply the compound in its plastic state, putting on a coat about one-half of an inch thick.

When the compound becomes dry, it is impervious to the action of water, and is not affected by the changes of the atmosphere. Roofs covered by my compound, are not liable to take fire, for the compound is fire-proof, and it may be used in furnaces and fire-places, instead of fire-brick.

Having described my invention,

What I claim, and desire to secure by Letters Patent, is—

A roofing-material, composed of clay, horse-manure, and glue, substantially as specified.

PELAG WERNI.

Witnesses:
L. L. COBURN,
HEINR. BRUNS.